United States Patent [19]

Asada et al.

[11] 3,776,772

[45] Dec. 4, 1973

[54] ELECTRICAL RESISTANCE COMPOSITION AND RESISTANCE ELEMENT

[75] Inventors: Eiichi Asada, Sakuradai; Minoru Nakagome, Tokyo, both of Japan

[73] Assignee: Shoei Chemical Industries Co., Ltd., Tokyo, Japan

[22] Filed: Nov. 17, 1971

[21] Appl. No.: 199,462

[30] Foreign Application Priority Data
Nov. 17, 1970 Japan.............................. 45/101207

[52] U.S. Cl.............. 117/227, 117/100 B, 252/512, 252/514
[51] Int. Cl........................... B44d 1/02, B05c 7/14
[58] Field of Search........................ 117/227, 100 B; 252/472, 512, 514

[56] References Cited
UNITED STATES PATENTS

| | | | |
|---|---|---|---|
| 3,622,367 | 11/1971 | Haag | 117/100 B |
| 3,352,797 | 11/1967 | Kim | 117/227 |
| 3,031,344 | 4/1962 | Sher et al. | 117/100 B |
| 3,562,122 | 2/1971 | Thieme | 252/472 |
| 3,637,344 | 1/1972 | Thompson | 252/472 |
| 3,637,530 | 1/1972 | Cassale | 117/201 |

Primary Examiner—Alfred L. Leavitt
Assistant Examiner—M. F. Esposito
Attorney—Norman F. Oblon et al.

[57] ABSTRACT

An electrical resistance composition has been provided using particles of ruthenium oxide which are coated with niobium and/or niobium oxide, and a glass frit.

5 Claims, No Drawings

ELECTRICAL RESISTANCE COMPOSITION AND RESISTANCE ELEMENT

BACKGROUND OF THE INVENTION

1. Field Of The Invention

The present invention relates to electrical resistance compositions and more particularly to an improved resistance composition which contains both fine composite particles of ruthenium oxide and powdered glass frit, which, upon firing, result in a resistor having a very low level of noise, reasonably minor fluctuations in initial resistance values and excellent TCR values.

This invention also relates to fired electrical resistor elements which are obtainable by applying the said composition material onto a heat-resistant insulating base.

2. Description Of Prior Art

It is now well known that ruthenium oxide can be used in forming fired electrical resistors (U.S. Pat. No. 3,271,193 and British Pat. No. 1,002,793), and that the ruthenium oxide will be less readily diffused into molten glass fractions during firing, as compared with Ag—Pd or Ag—PdO. Moreover, ruthenium oxide resistors are generally characterized by satisfactory resistance value stability and low resistor noise.

One difficulty which has been observed in the prior art resistors which use oxides of ruthenium, iridium or rhodium as conductive fractions, is that these metal oxides are not uniformly dispersed, and hence the resulting resistors suffer from deficient storage stability characteristics and from an appreciable fluctuation in initial resistance values.

In an effort to overcome this disadvantage, U.S. Pat. No. 3,326,645 disclosed the use of organic derivatives or resinates of ruthenium instead of the oxide. This expedient, however, was found to have even less storage stability due to the origin of the component, and had the additional disadvantage of the need for a quite intricate preparation scheme. Moreover, the resulting composition was found to have insufficient printability due to its relatively low metal content.

SUMMARY OF THE INVENTION

Accordingly, it is one object of this invention to provide an electrical resistance composition for electrical resistance elements, which are characterized by uniform initial resistance values, low electrical current noise, and excellent temperature coefficiency of resistance.

This and other objects of this invention, as will hereinafter become more apparent, can be attained by providing an electrical resistance composition which comprises particles of ruthenium oxide coated with niobium and/or niobium oxide, a glass frit and an organic vehicle for binding said materials.

DETAILED DESCRIPTION OF THE INVENTION

The ratio of ruthenium oxide to the niobium component may suitably be present in the range of 1 to about 40 to 1, and preferably 4 to about 20 to 1. The size of the particles of the ruthenium oxide coated with the niobium or niobium oxide, is usually less than 50 $\mu$, and preferably less than 10 $\mu$ in average particle diameter. The ruthenium oxide used can be either $RuO_2$ or $RuO$. The glass frit used for the composition of this invention can be any of a variety of frit compositions containing PbO, $B_2O_3$ and $SiO_2$. (For example, one suitable frit is lead borosilicate frit 63% PbO, 25% $B_2O_3$ and 12% $SiO_2$.)

Especially suitable are any of the conventional lead borosilicate frits of the prior art, particularly those having melting points of between 250° and 1,000°C., and preferably between 350° and 900°C. The ratio of coated particles to glass frit, is usually between 1 to 85: 99 to 15 and preferably 8 to 60: 92 to 40.

There is no limit on the quantity of organic vehicles which may be used as the binding agent. It should be used in sufficient amounts, however, to form a paste with the other components of the composition.

Suitable organic vehicles which may be used herein include the alcohols, esters, ethers, aromatic hydrocarbons, amides and amines and some plasticizers such as dibutylphthalate, octylphthalate. In addition, cellulose derivatives, resin, asphalt, polyacrylate, epoxy resin, polyesters, polystyrene, polyvinylacetate, melamine resin, alkyd resin, polyether and their solutions may also be employed as vehicles. In some cases, oily materials of natural origin such as terpineol, castor oil and other terpenoids may also be used.

In preparing the compositions of this invention, finely powdered ruthenium oxide is dispersed with a niobium organic derivative, in an organic solvent medium. The mixture is then subjected to pyrolysis to yield the niobium or niobium oxide coated ruthenium oxide particles.

Suitable niobium derivatives which may be used in forming the coated particles include niobium pentaethoxide, niobium pentabutoxide, niobium penta-isopentyloxide, niobium oxy-tributoxide, niobium penta-propoxide, niobium penta-t-butoxide, niobium penta-sec-butoxide, niobium penta-1-ethyl propoxide, niobium penta-1-methyl butoxide, niobium oxy-tripropoxide, or the like.

These composite particles may alternatively be produced by electroplating, electroless plating, vacuum deposition, or inorganic salt pyrolysis, onto the ruthenium oxide.

These particles are then mutually dispersed with a glass frit and an appropriate quantity of organic vehicle, in a ball mill, roll mill, kneader, or by other conventional means.

This composite is then coated onto a heat-resistant base by painting, spraying, dipping or roller coating and fired at a temperature within the range of 250° and 1,000°C. optimally from 350°–900°C. Upon firing, the organic materials (or vehicle) are burned, the glass frit is melted and the other inorganic materials are sintered. Resistance layers having thicknesses of from 0.5 to 100$\mu$, and preferably 3 to 30$\mu$ are obtainable in this manner.

Suitable heat-resistant electrically insulating bases onto which the coating may be applied include ceramics of alumina, steatite, forsterite, mullite, titania, barium titanate, magnesia, zirconia, beryllia, thoria, spinal, cordierite, zircon, lithia, pyroceram and glass, quartz, sapphire.

Other additives may be used with the composition of this invention, if necessary, including various metal powders, various metal oxides, various organo-metallic compounds, noble metal powders or noble metal oxides, depending upon the particular characteristics required. Such additional components will usually be present in amounts of less than 20% by weight, based on the total weight of the glass frit and coated particle composition.

The resistors formed from the compositions of this invention are generally characterized by an acceptable storage stability and a high degree of manufacturing reproducibility, and excellent electrical chaacteristics.

Having now generally described the invention, a further understanding can be attained by reference to certain specific examples which are presented herein for purposes of illustration only and are not intended to be limiting unless otherwise specifically specified.

EXAMPLE 1

50 g. of ruthenium oxide was thoroughly admixed with 56 g. of benzene solution containing 19.2 g. of niobium pentaethoxide, $Nb(OC_2H_5)_5$, and then the mixture was dried followed by pyrolysis to give 58.0 g. of composite powder with the $RuO_2/Nb$ ratio of 9/1.

EXAMPLE 2

60.2 g. of composite powder was obtained from 50 g. of ruthenium oxide and 71 g. of benzene solution containing 24.3 g. of niobium pentaethoxide, $Nb(OC_2H_5)_5$. The $RuO_2/Nb$ ratio was 7/1.

EXAMPLE 3

59.0 g. of composite powder was obtained from 50 g. of ruthenium oxide and 63 g. of benzene solution containing 21.5 g. of niobium pentaethoxide, $Nb(OC_2H_5)_5$. the $RuO_2/Nb$ ratio was 8/1.

EXAMPLE 4

53.7 g. of composite powder was obtained from 50 g. of ruthenium oxide and 26 g. of xylene solution containing 12.8 g. of niobium pentabutoxide, $Nb(OC_4H_9)_5$. The $RuO_2/Nb$ ratio was 19/1.

EXAMPLE 5

67.9 g. of composite powder was obtained from 50 g. of ruthenium oxide and 125 g. of xylene solution containing 61.6 g. of niobium penta-butoxide, $Nb(OC_4H_9)_5$. The $RuO_2/Nb$ ratio was 4/1.

EXAMPLE 6

60.2 g. of composite powder was obtained from 50 g. of ruthenium oxide and 71 g. of benzene solution containing 35.0 g. of niobium penta-butoxide, $Nb(OC_4H_9)_5$. The $RuO_2/Nb$ ratio was 7/1.

EXAMPLE 7

61.9 g. of composite powder was obtained from 50 g. of ruthenium oxide and 83 g. of benzene solution containing 47.1 g. of niobium penta-iso-pentyloxide, $Nb[OCH_2CH_2CH(CH_3)_2]_5$. The $RuO_2/Nb$ ratio was 6/1.

EXAMPLE 8

64.3 g. of composite powder was obtained from 50 g. of ruthenium oxide and 100 g. of cyclohexane solution containing 56.8 g. of niobium penta-iso-pentyloxide, $Nb[OCH_2CH_2CH(CH_3)_2]_5$. The $RuO_2/Nb$ ratio was 5/1.

EXAMPLE 9

56.0 g. of composite powder was obtained from 50 g. of ruthenium oxide and 42 g. of methyl ethyl ketone solution containing 23.9 g. of niobium penta-iso-pentyloxide, $Nb[OCH_2CH_2CH(CH_3)_2]_5$. The $RuO_2/Nb$ ratio was 12/1.

EXAMPLE 10

54.7 g. of composite powder was obtained from 50 g. of ruthenium oxide and 33 g. of methyl ethyl ketone solution containing 11.6 g. of niobium oxy-tributoxide, $NbO(OC_4H_9)_5$. The $RuO_2/Nb$ was 15/1.

EXAMPLE 11

54.1 g. of composite powder was obtained from 50 g. of ruthenium oxide and 29 g. of cyclohexane solution containing 10.2 g. of niobium oxy-tributoxide, $NbO(OC_4H_9)_5$. The $RuO_2/Nb$ ratio was 17/1.

EXAMPLE 12

61.9 g. of composite powder was obtained from 50 g. of ruthenium oxide and 83 g. of cyclohexane solution containing 29.3 g. of niobium oxy-tributoxide, $NbO(OC_4H9)_5$. The $RuO_2/Nb$ ratio was 6/1.

EXAMPLE 13

58.0 g. of composite powder was obtained from 50 g. of ruthenium oxide and 56 g. of xylene solution containing 23.4 g. of niobium pentapropoxide, $Nb(OC_3H_9)_5$. The $RuO_2/Nb$ ratio was 9/1.

EXAMPLE 14

60.2 g. of composite powder was obtained from 50 g. of ruthenium oxide and 71 g. of benzene solution containing 35.0 g. of niobium penta-tert-butoxide, $Nb[OC(CH_3)_3]_5$. The $RuO_2/Nb$ ratio was 7/1.

EXAMPLE 15

59.0 g. of composite powder was obtained from 50 g. of ruthenium oxide and 63 g. of benzene solution containing 31.1 g. of niobium penta-sec-butoxide, $Nb(O\text{-}sec\text{-}C_4H_9)_5$. The $RuO_2/Nb$ ratio was 8/1.

EXAMPLE 16

53.7 g. of composite powder was obtained from 50 g. of ruthenium oxide and 26 g. of xylene solution containing 14.8 g. of niobium penta-1-ethyl propoxide, $Nb[OCH(C_2H_5)CH_2CH_3]_5$. The $RuO_2/Nb$ ratio was 19/1.

EXAMPLE 17

67.9 g. of composite powder was obtained from 50 g. of ruthenium oxide and 125 g. of cyclohexane solution containing 61.6 g. of niobium penta-iso-butoxide, $Nb(O\text{-}iso\text{-}C_4H_9)_5$. The $RuO_2/Nb$ ratio was 4/1.

EXAMPLE 18

60.2 g. of composite powder was obtained from 50 g. of ruthenium oxide and 71 g. of cyclohexane solution containing 35.0 g. of niobium penta-tert-butoxide, $Nb(O\text{-}tert\text{-}C_4H_9)_5$. The $RuO_2/Nb$ ratio was 7/1.

EXAMPLE 19

61.9 g. of composite powder was obtained from 50 g. of ruthenium oxide and 83 g. of methyl ethyl ketone solution containing 47.1 g. of niobium penta-1-methylbutoxide, Nb[OCH(CH$_3$)C$_3$H$_7$]$_5$. The RuO$_2$/Nb ratio was 6/1.

EXAMPLE 20

64.3 g. of composite powder was obtained from 50 g. of ruthenium oxide and 100 g. of methyl ethyl ketone solution containing 30.8 g. of niobium oxy-tri-propoxide, NbO(OC$_3$H$_7$)$_3$. The RuO$_2$/Nb ratio was 5/1.

In the following Examples, the mean diameter of the composite particles is less than 10μ, and the glass frit had a melting range of from 350° to 850°C.

EXAMPLE 21

| | parts |
|---|---|
| composite particle,RuO$_2$/Nb=9/1 (obtained from Example 1) | 14 |
| powdered glass frit | 62 |
| cellulose solution | 24 |

A paste-like composition material was prepared from the above components by thorough admixing in a ball mill.

EXAMPLE 22

The same procedure as in Example 21 was applied for the following components:

| | parts |
|---|---|
| composite particle,RuO$_2$/Nb=7/1 (obtained from Example 2) | 9 |
| powdered glass frit | 66 |
| cellulose solution | 25 |

EXAMPLE 23

The same procedure as in Example 21 was applied for the following components:

| | parts |
|---|---|
| composite particle,RuO$_2$/Nb=9/1(obtained from Example 1) | 13 |
| powdered glass frit | 63 |
| cellulose solution | 24 |

EXAMPLE 24

The same procedure as in Example 21 was applied for the following components:

| | parts |
|---|---|
| composite particle,RuO$_2$/Nb=7/1 (obtained from Example 2) | 14 |
| powdered glass frit | 63 |
| polystyrene solution | 23 |

EXAMPLE 25

The same procedure as in Example 21 was applied for the following components:

| | parts |
|---|---|
| composite particle,RuO$_2$/Nb=9/1(obtained from Example 1) | 11 |
| powdered glass frit | 65 |
| alkyd resin solution | 24 |

EXAMPLE 26

The same procedure as in Example 21 was applied for the following components:

| | parts |
|---|---|
| composite particle,RuO$_2$/Nb=9/1 (obtained from Example 1) | 15 |
| powdered glass frit | 60 |
| melamine-alkyd solution | 25 |

EXAMPLE 27

The same procedure as in Example 21 was applied for the following components:

| | parts |
|---|---|
| composite particle,RuO$_2$/Nb=7/1 (obtained from Example 2) | 11 |
| powdered glass frit | 65 |
| cellulose solution | 24 |

EXAMPLE 28

The same procedure as in Example 21 was applied for the following components:

| | parts |
|---|---|
| composite particle,RuO$_2$/Nb=8/1(obtained from Example 3) | 15 |
| powdered glass frit | 61 |
| polystyrene solution | 24 |

EXAMPLE 29

The same procedure as in Example 21 was applied for the following components:

| | parts |
|---|---|
| composite particle,RuO$_2$/Nb=8/1 (obtained from Example 3) | 12 |
| powdered glass frit | 63 |
| alkyd resin solution | 25 |

EXAMPLE 30

The same procedure as in Example 21 was applied for the following components:

| | parts |
|---|---|
| composite particle,RuO$_2$/Nb=19/1 (obtained from Example 4) | 6 |
| powdered glass frit | 69 |
| melamine-alkyd solution | 25 |

EXAMPLE 31

The same procedure as in Example 21 was applied for the following components:

| | parts |
|---|---|
| composite particle,RuO$_2$/Nb=4/1 (obtained from Example 5) | 45 |
| powdered glass frit | 30 |
| cellulose solution | 25 |

EXAMPLE 32

The same procedure as in Example 21 was applied for the following components:

| | parts |
|---|---|
| composite particle,RuO$_2$/Nb=7/1(obtained from Example 6) | 15 |
| powdered glass frit | 60 |
| polystyrene solution | 25 |

EXAMPLE 33

The same procedure as in Example 21 was applied for the following components:

| | parts |
|---|---|
| composite particle,RuO$_2$/Nb=6/1 (obtained from Example 7) | 19 |
| powdered glass frit | 56 |
| alkyd resin solution | 25 |

EXAMPLE 34

The same procedure as in Example 21 was applied for the following components:

| | parts |
|---|---|
| composite particle,RuO$_2$/Nb=5/1(obtained from Example 8) | 41 |
| powdered glass frit | 34 |
| melamine-alkyd solution | 25 |

EXAMPLE 35

The same procedure as in Example 21 was applied for the following components:

| | parts |
|---|---|
| composite particle, $RuO_2/Nb=12/1$ (obtained from Example 9) | 11 |
| powdered glass frit | 64 |
| cellulose solution | 25 |

EXAMPLE 36

The same procedure as in Example 21 was applied for the following components:

| | parts |
|---|---|
| composite particle, $RuO_2/Nb=15/1$ (obtained from Example 10) | 15 |
| powdered glass frit | 60 |
| polystyrene solution | 25 |

EXAMPLE 37

The same procedure as in Example 21 was applied for the following components:

| | parts |
|---|---|
| composite particle, $RuO_2/Nb=17/1$ (obtained from Example 11) | 9 |
| powdered glass frit | 66 |
| alkyd resin solution | 25 |

EXAMPLE 38

The same procedure as in Example 21 was applied for the following components:

| | parts |
|---|---|
| composite particle, $RuO_2/Nb=6/1$ (obtained from Example 12) | 22.5 |
| powdered glass frit | 52.5 |
| melamine-alkyd solution | 25 |

EXAMPLE 39

The same procedure as in Example 21 was applied for the following components:

| | parts |
|---|---|
| composite particle, $RuO_2/Nb=9/1$ (obtained from Example 13) | 13.5 |
| powdered glass frit | 61.5 |
| cellulose solution | 25 |

EXAMPLE 40

The same procedure as in Example 21 was applied for the following components:

| | parts |
|---|---|
| composite particle, $RuO_2/Nb=7/1$ (obtained from Example 14) | 24 |
| powdered glass frit | 51 |
| polystyrene solution | 25 |
| indium oxide | 3 |

EXAMPLE 41

The same procedure as in Example 21 was applied for the following components:

| | parts |
|---|---|
| composite particle, $RuO_2/Nb=8/1$ (obtained from Example 15) | 19 |
| powdered glass frit | 56 |
| alkyd resin solution | 25 |
| tantalum oxide | 20 |

EXAMPLE 42

The same procedure as in Example 21 was applied for the following components:

| | parts |
|---|---|
| composite particle, $RuO_2/Nb=19/1$ (obtained from Example 16) | 9 |
| powdered glass frit | 66 |
| melamine-alkyd solution | 25 |
| gold powder | 5 |

EXAMPLE 43

The same procedure as in Example 21 was applied for the following components:

| | parts |
|---|---|
| composite particle, $RuO_2/Nb=4/1$ (obtained from Example 17) | 30 |
| powdered glass frit | 45 |
| cellulose solution | 25 |
| silver-resinate | 10 |

EXAMPLE 44

The same procedure as in Example 21 was applied for the following components:

| | parts |
|---|---|
| composite particle, $RuO_2/Nb=7/1$ (obtained from Example 18) | 17 |
| powdered glass frit | 58 |
| polystyrene solution | 25 |
| platinum powder | 3 |

EXAMPLE 45

The same procedure as in Example 21 was applied for the following components:

| | parts |
|---|---|
| composite particle, $RuO_2/Nb=6/1$ (obtained from Example 19) | 25 |
| powdered glass frit | 50 |
| alkyd resin solution | 25 |
| osmium oxide | 2 |

EXAMPLE 46

The same procedure as in Example 21 was applied for the following components:

| | parts |
|---|---|
| composite particle, $RuO_2/Nb=5/1$ (obtained from Example 20) | 26 |
| powdered glass frit | 49 |
| melamine-alkyd solution | 25 |
| iridium powder | 5 |

The compositions of the present invention were compared with those of the prior art as follows:

| Reference 47 | parts |
|---|---|
| Powdered $RuO_2$ | 7 |
| Powdered $Nb_2O_5$ | 4 |
| Powdered glass frit | 65 |
| Organic vehicle | 24 |

Above components were treated analogously to Example 21.

| Reference 48 | parts |
|---|---|
| Powdered $RuO_2$ | 12 |
| Powdered $Nb_2O_5$ | 1 |
| Powdered glass frit | 63 |
| Organic vehicle | 24 |

Above components were treated analogously to Example 21.

| Reference 49 | parts |
|---|---|
| Powdered $RuO_2$ | 36 |
| Powdered $Nb_2O_5$ | 9 |
| Powdered glass frit | 30 |
| Organic vehicle | 25 |

Above components were treated analogously to Example 21.

| Reference 50 | parts |
|---|---|
| Powdered $RuO_2$ | 23 |
| Powdered $Nb_2O_5$ | 2 |
| Powdered glass frit | 50 |

Organic vehicle 25

Above components were treated analogously to Example 21.

Reference 51
| | parts |
|---|---|
| Powdered RuO₂ | 27 |
| Powdered Nb₂O₅ | 3 |
| Powdered glass frit | 45 |
| Organic vehicle | 25 |

Above components were treated analogously to Example 21.

Initial resistance value, TCR and noise parameters for each of the above compounds are shown in Tables 1 and 2, as follows:

TABLE 1 — Initial Resistance

| Example No. | Max. ($\Omega$) | Min. ($\Omega$) | Average ($\Omega$) |
|---|---|---|---|
| 21 | 16.0 | 24.0 | 15.0 |
| 22 | 12.0 | 8.0 | 10.0 |
| 23 | 19.0 | 15.0 | 17.0 |
| 24 | 14.0 | 10.0 | 12.0 |
| 25 | 19.0 | 17.0 | 18.0 |
| 26 | 10.6 | 8.0 | 9.6 |
| 27 | 8.9 | 8.1 | 85.0 |
| 28 | 14.0 | 12.0 | 13.0 |
| 29 | 53.0 | 41.0 | 47.0 |
| 30 | 2.6 | 2.1 | 2.3 |
| 31 | 26.0 | 24.0 | 25.0 |
| 32 | 40.0 | 36.0 | 37.0 |
| 33 | 8.5 | 7.6 | 8.2 |
| 34 | 98.0 | 95.0 | 96.0 |
| 35 | 80.0 | 75.0 | 78.0 |
| 36 | 26.0 | 23.0 | 25.0 |
| 37 | 265.0 | 248.0 | 255.0 |
| 38 | 3.7 | 3.4 | 3.6 |
| 39 | 50.0 | 45.0 | 47.0 |
| 40 | 2.7 | 2.4 | 2.6 |
| 41 | 12.0 | 11.0 | 11.2 |
| 42 | 201.0 | 186.0 | 198.0 |
| 43 | 262.0 | 248.0 | 250.0 |
| 44 | 16.0 | 14.0 | 15.0 |
| 45 | 890.0 | 858.0 | 870.0 |
| 46 | 723.0 | 682.0 | 709.0 |
| Reference: | | | |
| 47 | 74.0 | 12.0 | 43.0 |
| 48 | 22.0 | 6.0 | 14.0 |
| 49 | 48.0 | 11.0 | 28.0 |
| 50 | 480.0 | 111.0 | 270.0 |
| 51 | 970.0 | 311.0 | 540.0 |

TABLE 2 — TCR & Noise Parameter

| Example No. | TCR (ppm/°C.) | Noise Parameter (dB) |
|---|---|---|
| 21 | 96.0 | −12.0 |
| 22 | 43.0 | −14.0 |
| 23 | 32.0 | −10.0 |
| 24 | 18.0 | −13.0 |
| 25 | 84.0 | −9.0 |
| 26 | 76.0 | −15.0 |
| 27 | 45.0 | −9.5 |
| 28 | 48.0 | −12.5 |
| 29 | 28.0 | −9.8 |
| 30 | 97.0 | +3.0 |
| 31 | 92.0 | −35.0 |
| 32 | 5.0 | −10.0 |
| 33 | 12.0 | −13.0 |
| 34 | 80.0 | −32.0 |
| 35 | 65.0 | −7.0 |
| 36 | 20.0 | −21.0 |
| 37 | 73.0 | −1.0 |
| 38 | 42.0 | −17.0 |
| 39 | 48.0 | −9.0 |
| 40 | 35.0 | −20.0 |
| 41 | 73.0 | −14.0 |
| 42 | 85.0 | −1.0 |
| 43 | 78.0 | −28.0 |
| 44 | 26.0 | −12.0 |
| 45 | 68.0 | −22.0 |
| 46 | 71.0 | −24.0 |
| Reference: | | |
| 47 | 380.0 | +12.0 |
| 48 | 320.0 | +8.0 |
| 49 | 670.0 | −5.0 |
| 50 | 570.0 | −3.0 |
| 51 | 470.0 | −1.0 |

The TCR values and noise parameters were obtained by use of a Wheatstone bridge and Quen-Tech noise meter, respectively. As can be seen from the above tables, the initial resistance values obtained from the present composition showed only a minor deviation as compared with those of References 47-51 (from the prior art). Analogous results can also be seen as regards TCR and noise parameter given in Table 2.

These good results are believed to be due to the use of the composite structure which facilitates both uniform dispersion of the particles in the molten state and facilitates the formation of an evenly fired surface with equalized and fully reproducible characteristics.

The use of niobium oxide is believed to be particularly advantageous in that it is known that this material is an effective additive for controlling TCR. In the composite form, this material has been found to be especially effective.

Having now fully described the invention, it will be apparent to one of ordinary skill in the art that many changes and modifications can be made thereto without departing from the spirit or scope of the invention.

What is claimed as new and desired to be secured by letters patent is:

1. An electrical resistance composition which comprises particles of ruthenium oxide which are coated with niobium, niobium oxide or mixtures thereof wherein the ratio of ruthenium oxide to niobium component is from 1 to 40:1.

2. The composition of claim 1, wherein the ratio of ruthenium oxide to niobium component is from 1 to 40:1, and the particle size is less than 50$\mu$.

3. The composition of claim 1, wherein the ratio of ruthenium oxide to niobium component is from 4 to 20:1.

4. An electrical resistance element which comprises a high temperature resistant, electrically non-conductive substrate having a film of resistance material coated thereon wherein said resistance material comprises a sintered mixture of ruthenium oxide coated with niobium, niobium oxide or mixtures thereof wherein the ratio of ruthenium oxide to niobium component is from 1 to 40:1, and a glass frit.

5. The element of claim 4, wherein the ratio of coated ruthenium oxide particles to said glass frit is from 1 to 85:99 to 15.

* * * * *